(12) United States Patent
Kulkarni

(10) Patent No.: US 11,485,330 B1
(45) Date of Patent: Nov. 1, 2022

(54) FORCE TRANSDUCER FOR A MULTIFUNCTION TRAILER CONTROLLER

(71) Applicant: HORIZON GLOBAL AMERICAS INC., Plymouth, MI (US)

(72) Inventor: Chandrakumar D. Kulkarni, Battle Creek, MI (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 0 days.

(21) Appl. No.: 17/672,152

(22) Filed: Feb. 15, 2022

Related U.S. Application Data

(60) Provisional application No. 63/298,392, filed on Jan. 11, 2022, provisional application No. 63/277,328, filed on Nov. 9, 2021.

(51) Int. Cl.
| | | |
|---|---|---|
| *B60L 9/00* | (2019.01) | |
| *G05D 1/00* | (2006.01) | |
| *G05D 3/00* | (2006.01) | |
| *B60T 8/17* | (2006.01) | |
| *B60D 1/24* | (2006.01) | |
| *B60T 8/171* | (2006.01) | |
| *B62D 59/04* | (2006.01) | |
| *B60L 15/20* | (2006.01) | |
| *B60D 1/62* | (2006.01) | |
| *B60L 58/12* | (2019.01) | |
| *G01L 5/00* | (2006.01) | |
| *H04W 76/10* | (2018.01) | |
| *B60L 7/18* | (2006.01) | |

(52) U.S. Cl.
CPC ............ *B60T 8/1701* (2013.01); *B60D 1/242* (2013.01); *B60D 1/248* (2013.01); *B60D 1/62* (2013.01); *B60L 7/18* (2013.01); *B60L 15/2009* (2013.01); *B60L 58/12* (2019.02); *B60T 8/171* (2013.01); *B62D 59/04* (2013.01); *G01L 5/0004* (2013.01); *H04W 76/10* (2018.02); *B60L 2200/28* (2013.01); *B60T 2250/04* (2013.01); *B60T 2270/60* (2013.01)

(58) Field of Classification Search
CPC .... B60T 8/1701; B60T 8/171; B60T 2250/04; B60T 2270/60; B60D 1/242; B60D 1/248; B60D 1/62; B60L 7/18; B60L 15/2009; B60L 58/12; B60L 2200/28; B62D 59/04; G01L 5/0004
See application file for complete search history.

(56) References Cited

U.S. PATENT DOCUMENTS

| | | | | |
|---|---|---|---|---|
| 8,033,563 | B2 * | 10/2011 | Good | B60D 1/583 280/515 |
| 8,463,519 | B2 * | 6/2013 | McCann | B60T 7/20 280/428 |
| 8,890,670 | B2 * | 11/2014 | Brey | B60T 7/16 340/440 |

(Continued)

*Primary Examiner* — Mussa A Shaawat
(74) *Attorney, Agent, or Firm* — McDonald Hopkins LLC

(57) ABSTRACT

A controller for a trailer is disclosed. An example trailer controller assembly includes a force transducer that measures a force between a trailer and a towing vehicle connected to the trailer indicative of a difference in speeds between the trailer and the towing vehicle, and a controller communicatively coupled to the force transducer. The controller includes a brake controller that controls brakes of the trailer based on an input signal from the force sensor.

20 Claims, 9 Drawing Sheets

(56) References Cited

U.S. PATENT DOCUMENTS

| | | | | |
|---|---|---|---|---|
| 9,026,311 B1* | 5/2015 | Pieronek | B60T 8/1708 | 280/455.1 |
| 9,315,173 B1* | 4/2016 | Gray | B60T 7/042 | |
| 9,327,566 B2* | 5/2016 | McAllister | B60D 1/62 | |
| 9,738,125 B1* | 8/2017 | Brickley | B60D 1/62 | |
| 11,420,695 B2* | 8/2022 | Viele | B62D 59/04 | |
| 2003/0168908 A1* | 9/2003 | Robinson | B60T 13/74 | 303/7 |
| 2008/0177454 A1* | 7/2008 | Bond | B60T 8/1708 | 701/70 |
| 2009/0107735 A1* | 4/2009 | Cleary | G01G 19/08 | 177/136 |
| 2009/0302574 A1* | 12/2009 | Columbia | B60D 1/06 | 280/507 |
| 2010/0152920 A1* | 6/2010 | McCann | B60T 7/20 | 701/2 |
| 2012/0024081 A1* | 2/2012 | Baker | G01L 5/136 | 280/511 |
| 2012/0041659 A1* | 2/2012 | Greene | B60D 1/30 | 701/70 |
| 2013/0253814 A1* | 9/2013 | Wirthlin | G01G 19/02 | 701/1 |
| 2014/0046566 A1* | 2/2014 | Maitlen | B60T 8/172 | 701/70 |
| 2014/0110918 A1* | 4/2014 | McCoy | B60D 1/488 | 116/212 |
| 2014/0327229 A1* | 11/2014 | Scharf | B60D 1/62 | 177/136 |
| 2015/0137482 A1* | 5/2015 | Woolf | B60D 1/62 | 280/448 |
| 2015/0204741 A1* | 7/2015 | Hagan | B60L 53/14 | 180/65.21 |
| 2018/0080852 A1* | 3/2018 | Hagan, Jr. | B60D 1/62 | |
| 2018/0215358 A1* | 8/2018 | Hall | B60T 8/3205 | |
| 2019/0217831 A1* | 7/2019 | Viele | G07C 5/0816 | |
| 2019/0233034 A1* | 8/2019 | Viele | B62D 59/04 | |
| 2019/0291593 A1* | 9/2019 | Healy | B60K 1/04 | |
| 2019/0299946 A1* | 10/2019 | Miller, Jr. | B60T 8/38 | |
| 2020/0102009 A1* | 4/2020 | Owen | B62D 15/028 | |
| 2020/0122715 A1* | 4/2020 | Layfield | B60L 50/16 | |
| 2020/0282965 A1* | 9/2020 | Pieronek | B60T 8/1708 | |
| 2021/0070265 A1* | 3/2021 | Roether | B60W 30/02 | |
| 2021/0370892 A1* | 12/2021 | Stearns | B60Q 1/44 | |
| 2022/0041069 A1* | 2/2022 | Layfield | B62D 59/04 | |

* cited by examiner

FORCE TRANSDUCER FOR A MULTIFUNCTION TRAILER CONTROLLER

CROSS-REFERENCE TO RELATED APPLICATIONS

This application claims priority to U.S. Provisional Patent Application No. 63/298,392 entitled "MULTIFUNCTION CONTROLLER FOR A TRAILER" filed on Jan. 11, 2022 and U.S. Provisional Patent Application No. 63/277,328 entitled "CONTROLLER FOR AN ELECTRIC TRAILER" filed on Nov. 9, 2021, which are both hereby incorporated by reference in their entirety.

TECHNICAL FIELD

The present disclosure generally relates to trailers and, more specifically, a multifunction controller for a trailer coupled to a force transducer.

BACKGROUND

As towing vehicles gain more safety and communication features (e.g., driver lane assist, sway control, blind spot detection, etc.), trailers are in need of such safety and communication features. Modern trailers are both mechanically coupled (e.g., via a hitch, etc.) and electrically coupled (e.g., via a wire harness, etc.) to a towing vehicle. However, these systems are complicated and require that more information from the trailer to be passed to the towing vehicle for processing. There is also a need then for instructions to be returned to the trailer based on that processing. This delay can be critical in some situations. On top of that, a towing vehicle may not be configured to or be configurable to take advantage of the features of the various trailers that it might connect to.

Further, towed vehicles add weight and are often not very aerodynamic. This increases fuel consumption and/or decreases travel range of the towing vehicle on a charge (such as an electric truck vehicle). The towed vehicles also effect driving dynamics for the towing vehicle. These effects can be particularly severe in situations when the towing vehicle needs more horsepower to pull the towed vehicle. For example, certain situations may increase fuel consumption and/or decrease travel range of the truck on a charge (for an electric vehicle) such as when towing the trailer up an incline and/or when towing a heavy trailer.

SUMMARY

As described herein, a controller for a trailer communicates various trailer status information, warnings and cautions, diagnostic information about the trailer to a towing vehicle via a wired and/or wireless connection, such as a CAN Bus connection, a serial protocol connection (e.g., RS-232, secured I2C, LIN, etc.), a Bluetooth® connection, and/or another radio frequency (RF) based connection, and/or a custom wired connection, etc. The trailer controller separates direct control on trailer-based functions from the towing vehicle. That is, the trailer controller controls the trailer-based functions based on information received from, in part, the towing vehicle. The trailer controller communicates with a towing vehicle and coordinates the motive functions, the safety functions, the lighting functions, and/or braking functions, etc. of the trailer. In some examples, the towing vehicle includes a towing controller that is configured to cooperate and coordinate with the trailer controller. The trailer controller receives status signals (e.g., vehicle speed, speed of each of the wheels, status of anti-lock brake system, status of stability control system, status of the collision detection/avoidance system, navigation data, positioning data, etc.) and/or control signals (e.g., braking control signals, acceleration control signal, lighting control signals, position of steering wheel, etc.). With these signals and measurements from onboard sensors, the trailer controller controls the functions of the trailer.

In some examples, the trailer controller is configured to operate with a trailer that communicates various trailer status information, warnings and cautions, diagnostic information about the electric trailer to a towing vehicle via the wired and/or wireless connection (sometimes referred to as an "electric trailer controller"). The trailer controller communicates with the towing vehicle and coordinates the safety functions, the lighting functions, and/or braking functions, etc. of the trailer. When the trailer controller is installed in an electric trailer, the trailer controller may also coordinate the self-propelled motive functions with the towing vehicle. In some examples, the towing vehicle includes a towing controller or a private node configured to cooperate and coordinate with the trailer controller. The trailer controller receives status signals (e.g., vehicle speed, speed of each of the wheels, status of anti-lock brake system, status of stability control system, status of the collision detection/avoidance system, navigation data, positioning data, etc.) and/or control signals (e.g., braking control signals, acceleration control signal, lighting control signals, position of steering wheel, etc.). With these signals and measurements from onboard sensors, the trailer controller controls the motive functions of the electric trailer.

An example trailer controller assembly includes (i) a force transducer that measures a force between a trailer and a towing vehicle connected to the trailer indicative of a difference in speeds between the trailer and the towing vehicle, and (ii) a controller communicatively coupled to the force transducer. The controller includes a brake controller that controls brakes of the trailer based on an input signal from the force sensor.

An example trailer controller assembly controls motive functions of an electric trailer. The trailer controller assembly includes a coupler, a force transducer mounted to the coupler, and a trailer controller. The coupler has a front piece, a back piece, and a hydraulic cylinder coupled to the front piece and the back piece. The front piece and the back piece are slidably coupled together. The force transducer measures a force between a towing vehicle and the trailer connected to the towing vehicle indicative of a difference in speeds between the trailer and the towing vehicle. The force transducer measures a quantity of the hydraulic cylinder as the front piece and the back piece move relative to each other. The trailer controller is communicatively coupled to the force transducer. The trailer controller includes (i) a communication controller that communicatively couples with the towing vehicle to receive braking information of the towing vehicle over a data bus or communications medium, (ii) an electric controller configured to communicatively couple to electric motor controllers of the trailer that drive electric motors to provide motive force to the trailer independent of the towing vehicle, and (iii) a brake controller configured to control brakes of the trailer based on an input signal from the force sensor to maintain a general equilibrium in the speeds (e.g., a predetermine pull-force) between the trailer and the towing vehicle. The electric controller controls a driving speed at which the electric motor controllers drive the electric motors that provide motive force to the trailer wheels.

BRIEF DESCRIPTION

Operation of the disclosure may be better understood by reference to the following detailed description taken in connection with the following illustrations, wherein.

DESCRIPTION

Figure 1:
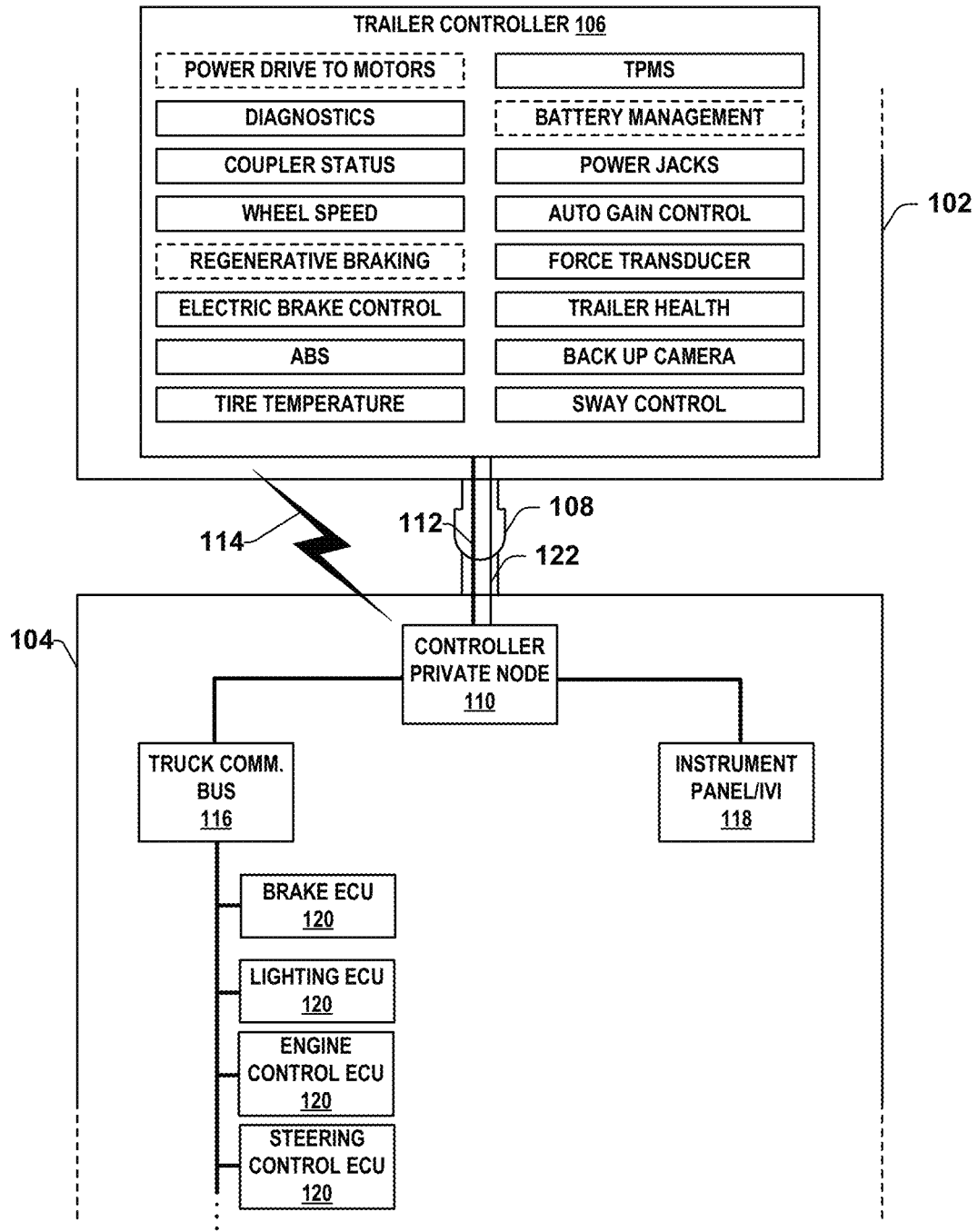
FIG. 1 is a conceptual diagram of a trailer controller on a trailer interfacing with components of a towing vehicle, in accordance with the teachings of this disclosure.

Reference will now be made in detail to embodiments of the present teachings, examples of which are illustrated in the accompanying drawings. It is to be understood that other embodiments may be utilized, and structural and functional changes may be made without departing from the scope of the present teachings. Moreover, features of the embodiments may be combined, switched, or altered without departing from the scope of the present teachings, e.g., features of each disclosed embodiment may be combined, switched, or replaced with features of the other disclosed embodiments. As such, the following description is presented by way of illustration and does not limit the various alternatives and modifications that may be made to the illustrated embodiments and still be within the spirit and scope of the present teachings.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

As trailers become more capable as sophisticated, the necessity of robust coordination between the trailer and the towing vehicle increases. Standard seven-wire connections are not configured to be robust enough to handle the volume of communication necessary for such coordination. Additionally, commands generated by the towing vehicle may not take into account the volume of environment, spatial, and motive data that is available to a trailer. As such, coordination based on solely on commands from the towing vehicle may provide a less optimal and less responsive experience driving.

Additionally, to improve performance for the towing vehicle, trailers may include electric drivetrains that, at least in part, provide motive force for the trailer. As used herein, a trailer with an electric drivetrain may be referred to as an "electric trailer" or an "electric towed vehicle." The electric drivetrain may, for example, be used during normal driving to reduce fuel consumption or increase battery life of the towing vehicle. In another example, the electric drivetrain of the trailer may be engaged in an assist mode during energy-intensive activities, such as when the towing vehicle and trailer as ascending a hill. This increases the range of the towing vehicle and, in some instances, the ability of the towing vehicle to tow the trailer. However, there is a need for the trailer to communicate with the towing vehicle in order to coordinate forward motion and to increase trailer stability.

Often, the needs of an electric trailer are different from, the needs of a trailer without an electric drivetrain (sometimes referred to as a "conventional trailer" or a "conventional towed vehicle"). For example, when the electric trailer is providing its own motive force, it must coordinate more than lighting and/or braking with the towing vehicle. The electric trailer includes a battery bank. Additionally, the electric trailer includes one or more electric motors to drive the wheels. In some examples, the electric trailer may have an independent drive for each wheel with an integrated control for all wheels. Each wheel may have a wheel speed sensors (such as those disclosed in US Patent Publication No. 20200348327, which is incorporated herein by reference). The electric trailer may include a battery charger to charge the batteries to restore the energy lost during braking.

The trailer controller described below communicates with the towing vehicle and coordinates the motive functions, the safety functions (e.g., stability control, etc.), the lighting functions, and the braking functions, etc. of the conventional trailer. In some examples, when the trailer controller is an electric trailer controller, it communicates with the towing vehicle and also coordinates the motive functions of the electric trailer. In some examples, the towing vehicle includes a towing controller that is configured to cooperate and coordinate with the electric trailer controller. In some examples, towing vehicle includes a towing controller that is configured to communicate with a conventional trailer controller. In some examples, the towing vehicle provides a connection to the vehicle data bus (e.g., the Controller Area Network (CAN) bus, LIN, etc.) to communicatively couple the electric trailer controller to the vehicle data bus.

In some examples, a control module on the towing vehicle and the trailer controller on the trailer may divide processing of the information received from the respective vehicles to control the trailer according to the system described below. For examples, the trailer controller may perform all processing and control (e.g., the control module on the towing vehicle acts as a pass-through device), processing may be functionally divided between the control module and trailer controller (e.g., audiovisual processing by the control module and control processing by the trailer controller, etc.), or processing may be performed by a combination of the control module, the trailer controller, and one or more specialty modules (e.g., separate modules that handle the communication connections, a separate module for audio-visual processing of camera data, etc.). While the trailer controller is described as one module below, the trailer controller may be separated into physically different modules that are communicatively coupled (e.g., via a data bus) to coordinate and perform different tasks (e.g., one module to control the motive functions, one module to perform the diagnostic functions, one module to perform the audiovisual processing, one module to handle the communication connections, etc.).

FIG. 1 is a conceptual diagram illustrating a trailer 102 electrically, communicatively, and mechanically coupled to a towing vehicle 104. The trailer 102 may be an electric trailer (e.g., that provides its own motive force using electric motors, etc.) or a conventional, non-electric trailer (e.g., a trailer that does not provide its own motive force, etc.). As used herein, the term "motive functions" refers to: (a) both braking and motor-propelled drive function of an electric trailer or (b) the braking functions of a non-electric trailer. In the illustrated example, the trailer 102 includes a trailer controller 106. As described below, the trailer controller 106 includes circuitry (e.g., one or more processors, memory, drivers, etc.) to: (i) communicate with sensors, motors, and other components of the trailer (e.g., brakes, batteries, sensors, etc.), (ii) communicate with the towing vehicle 104, and (iii) control the motive, lighting, braking, and power management functions of the trailer 102. For example, the trailer 102 may (a) perform diagnostics on systems of the trailer 102 and report the diagnostics to the towing vehicle 104, (b) monitor the status between a coupler 108 that is electrically, mechanically, and/or communicatively coupling trailer 102 and the towing vehicle 104, (c) control the trailer 102 based on that status, (d) monitor the speed of each of the wheels of the trailer 102, (e) control the brakes of the trailer 102, (f) provide an anti-lock braking system for brakes (e.g., the hydraulic brakes, the electric brakes, etc.) of the trailer 102, (g) monitor tire temperature, (h) monitor tire pressure, (j) monitor power jack status and/or slideout room status, (k) perform gain control for the trailer 102 or more specifically for the trailer brake controller, (l) monitor a force transducer in the coupler 108, (m) control braking of the trailer 102 based on the force transducer, (n) monitor health of the components of the trailer 102, (o) couple to one or more cameras (e.g., a backup camera, side-view cameras, etc.) on the trailer 102, (p) perform sway control, and/or (q) perform weight distribution, etc. In some examples, when the trailer controller 106 is controlling an electric trailer 102, the trailer controller 106 may (a) control the power driver to the electric motors of the electric trailer 102, (b) perform power and/or battery management for the electric trailer 102, and/or (c) monitor and control regenerative braking.

In the illustrated example, the trailer controller 106 may be communicatively coupled with a controller private node 110 on the towing vehicle 104. The trailer controller 106 establishes a wired connection 112 and/or a wireless connection 114 with the controller private node 110. In some examples, the trailer controller 106 establishes both the wired connection 112 (e.g., via the coupler 108, etc.) and the wireless connection 114 with the controller private node 110 to provide communication redundancy. In some examples, the trailer controller 106 may have multiple available wireless connections (e.g., Bluetooth, Wi-Fi, Z-wave, etc.) to facilitate configurably establishing a wireless connection with different configurations of the controller private node 110. In some examples, the trailer controller 106 includes redundant hardware for the wireless connections to make the communication robust and fault tolerant.

In some examples, the trailer controller 106 includes multiple communication controllers (e.g., wireless communication controllers, etc.) to provide communication redundancy. For example, during normal operation, the trailer controller 106 may use one wireless controller to communicate with the controller private node 110, and, if that wireless controller fails or otherwise loses connection, the trailer controller 106 may then switch to a second wireless controller to communicate with the controller private node 110. In some examples, the trailer controller 106 is communicatively coupled with a controller private node 110 via two wired connections 112 to provide communication redundancy. In such examples, the two wired connections 112 may be different types of wired connection (e.g., CAN bus, LIN bus, I2C connection, MIL-STD-1553 connection, RS-232 connection, 1-Wire connection, Ethernet connection, a custom connection, etc.). In some examples, some types of data (e.g., diagnostic codes, instructions, towing vehicle data, etc.) may ordinarily use the primary connection and some types of data (e.g., video data, etc.) may ordinarily use the secondary connection. In some such examples, if the primary connection fails, the trailer controller 106 may switch the types of data that ordinarily use the primary connection to the secondary connection and pause or otherwise limit the transmission of the types of data that ordinarily use the secondary connection. In some examples, if both connections were to fail or be disrupted, the trailer controller 106 executes a limited operation strategy until at least one of the connections is reestablished. As described below in connection with FIGS. 4A and 4B, the wired connection 112 may have different configurations.

In some examples, when the trailer controller 106 is in theft detection mode and the trailer controller 106 detects that a theft may be occurring (e.g., as described above), the trailer controller 106 may use the wireless communication controller to notify the owner (e.g., via the app 222) and/or the authorities (e.g., the police, the sheriff, a third party security company, etc.) of the theft detection, and, in some examples, provide GPS coordinates. For example, the trailer controller may use a cellular connection to communicate with the owner and/or the authorities and provide coordinates over this communication. In some examples, the trailer controller 106 may configure its wireless communication controller as a beacon to broadcast its identity, an emergency message, and/or its GPS coordinates.

As described below, the controller private node 110 provides an interface between the trailer controller 106 and (a) a communication bus 116 and (b) the instrument panel and/or in-vehicle infotainment system (IVI) 118 of the towing vehicle 104. The trailer controller 106 may receive data from electronic control units (ECUs) 120 and send data to the ECUs 120 on the communication bus 116 via the controller private node 110. Additionally, in some examples, the controller private node 110 also monitors and/or controls a power connection 122 between the electric trailer 102 and the towing vehicle 104.

In some examples, the controller private node 110 provides for/cooperates with the trailer controller 106 to establish a secured wired connection 112 and/or wireless connection 114 (e.g., cryptographically secured, etc.) to prevent, for example ease dropping and/or man-in-the-middle attacked, etc. In some examples, the controller private node 110 and the trailer controller 106 may pair (e.g., establish a trusted relationship, etc.) such that the trailer controller 106 can recognized when it is connected to an authorized towing vehicle 104 and vice versa (e.g., via a handshake, etc.).

Figure 2:
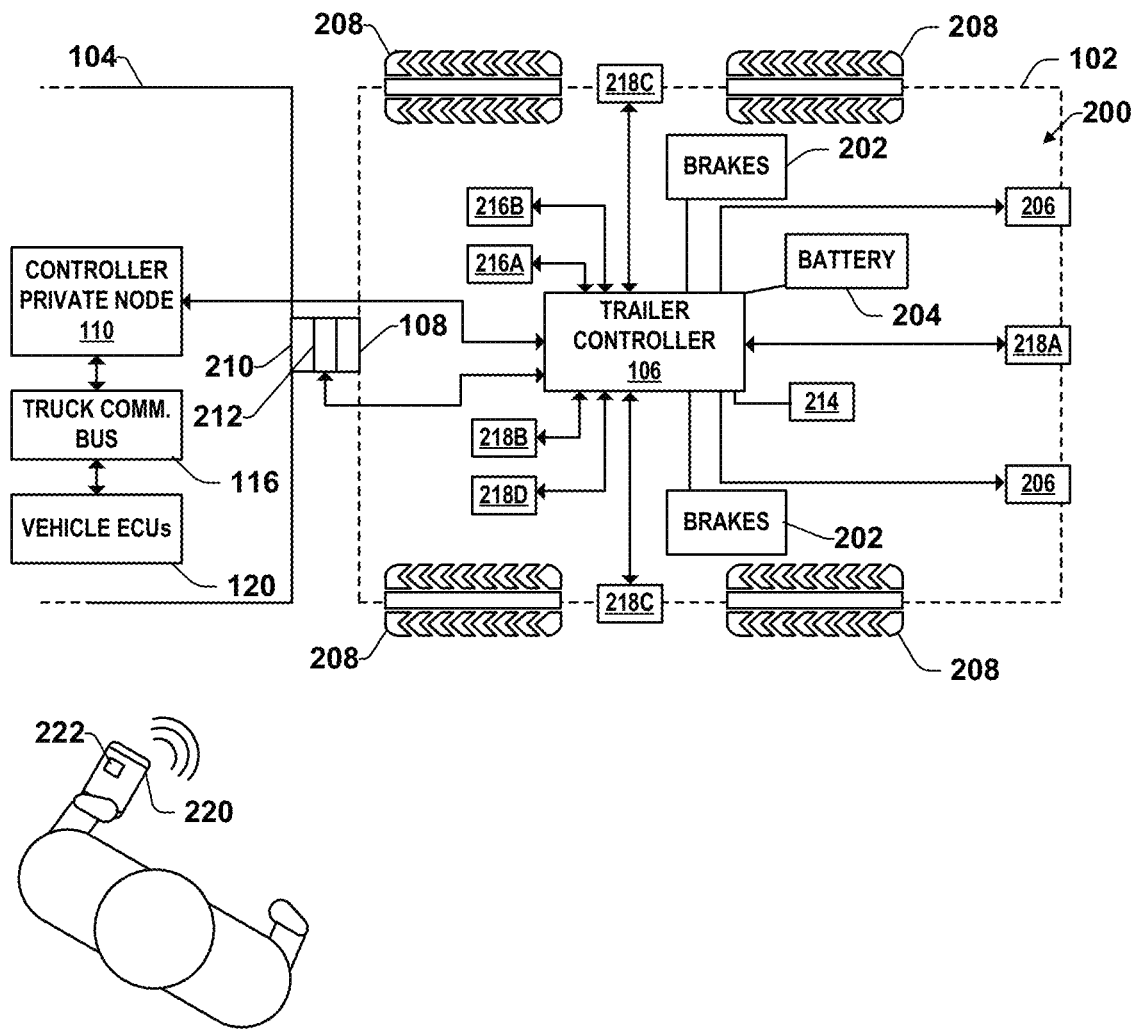
FIG. 2 is a block diagram of an electro-mechanical system of the trailer with the trailer controller of FIG. 1, in accordance with the teachings of this disclosure.

FIG. 2 illustrates an electro-mechanical system 200 of the trailer 102 connected to the towing vehicle 104. The electro-mechanical system 200 includes a trailer controller 106 that coordinates with and/or reacts to information received from the towing vehicle 104, sensors (e.g., force transducers, gyroscopes, accelerometers, angle sensors, wheel speed sensors, precipitation sensors, battery condition sensors, etc.) on the trailer 102, and/or electronics that provide status indicators of parts of the trailer 102 (e.g., electronics that relay the status of the coupler (connected or disconnected), the power jack (extended or stowed), the slideout room (deployed or stowed), the power step (deployed or stowed), etc.). In the illustrated example, the electro-mechanical system 200 of the trailer 102 also includes brakes 202 and one or more batteries 204. In some examples, the electro-mechanical system 200 may include the battery controller as described in connection to FIG. 3 below to provide regenerative braking to recharge the battery 204 when the battery 204 is below a threshold state-of-charge (SoC). In such scenarios, the electro-mechanical system 200 may include components for regenerative braking. The electro-mechanical system 200 may also include various lights 206 (e.g., turn signals, brake lights, reverse lights, tail lights, and/or rear fog lamps, etc.), such that the trailer controller 106 may also control the lights 206 of the trailer 106 based on light control signals from the towing vehicle 104. The trailer controller 106 controls the lights 206 based on power from the battery 204 on the trailer 102 such that signals from the towing vehicle 104 do not have to provide power to control the lights 206.

In the illustrate example, the brakes 202 are coupled to wheels 208. The brakes 202 are communicatively coupled to the trailer controller 106 to be controlled by the trailer controller 106. The braking signals produced by the trailer controller 106 may comprise a pulse width modulation (PWM). Examples of techniques used by controllers to, at least in part, produce or rely on pulse width modulated braking signals are described in U.S. Pat. No. 6,068,352 entitled "Microprocessor-Based Control for Trailer Brakes," and U.S. Pat. No. 8,746,812 entitled "Brake Control Unit," which are both incorporated by reference herein their entirety. In some examples, the trailer controller 106 uses braking signal from the towing vehicle 104 to control the operation of the brakes 202. Alternatively, in some examples, the trailer controller 106 uses braking signal from the towing vehicle 104 as an indicator of the braking intent of the driver and controls the operation of the brakes 202 based on the braking intent and the other signals received by the trailer controller 106 as described herein (e.g., from force transducers, inertia sensors, visual sensors, etc.).

The trailer 102 is mechanically and communicatively coupled to the towing vehicle 104. In the illustrated example, the coupler 108 mechanically and, in some examples, communicatively couples the trailer 102 to a hitch 210 of the towing vehicle 104. The coupler 108 includes a force transducer 212 to measure a force generated when the speeds of the towing vehicle 104 and trailer 102 are not equal. In some examples, the trailer controller 106 may put the force transducer 212 into an idle, off, or low power mode when, for example, the coupler 118 is not mechanically connected to the hitch 212 of the towing vehicle 104. As used herein, the force transducer 212 may be any sensor or combination of sensors described in connection with FIGS. 6, 7, 8, 9 and 10 below. In some examples, the coupler 108 includes a breakaway sensor that detects when the coupler 108 is mechanically coupled to the hitch 210. In some examples, the breakaway sensor detects various degrees of mechanical separation (e.g., total separation, partial separation, total connection, etc.).

The trailer controller 106 is communicatively coupled with the towing vehicle 104 via a wired or wireless connection 112 and 114 between the trailer controller 106 and the controller private node 110 of the towing vehicle 104. In some examples, the trailer controller 106 is communicatively coupled with the towing vehicle 104 via multiple connected (e.g., the wired connection 112 and the wireless connection 114, etc.). In some such examples, one connection (e.g., the wired connection 112) is a primary connection and the other connection (e.g., the wireless connection 114) is a secondary connection that is used when the primary connection is not available (e.g., when the trailer controller 106 detects that the coupler 108 is not engaged, etc.). For example, when the trailer controller 106 detects, via the breakaway sensor, that trailer 102 is no longer physically connected to the towing vehicle 104 (e.g., a mid-travel breakaway is detected, etc.), the trailer controller 106 may use the wireless connection 114 to communicate the breakaway status to the private controller node 110.

The controller private node 110 may be a towing vehicle-based controller or other electronic control unit (ECU) configured to interact with the trailer controller 106 from the perspective of the towing vehicle 104 (e.g., compiles relevant information from the vehicle bus as disclosed herein and/or generates control signals for the trailer controller 106, etc.). Additionally, in some examples, the controller private node 110, in conjunction with the trailer controller 106, facilitates a secure connection (e.g., a cryptographically secure) between the trailer 102 and the towing vehicle 104 to prevent, for example, an interloping device from intercepting and/or injecting information between the between the trailer 102 and the towing vehicle 104.

As described below, the controller private node 110 facilitates other security measures, such as theft detection, by establishing a trusted relationship between the controller private node 110 to the trailer controller 106. In some examples, the controller private node 110 may receive emergency instructions from the trailer controller 106. In some such examples, the controller private node 110 is configured to, in response to receiving an emergency instruction from the trailer controller 106, communicate with the relevant ECUs 120 to prevent the towing vehicle 104 from performing an act that would be detrimental to the trailer 102 based on the current status of the trailer 102. For example, the trailer controller 106 may provide an instruction to prevent the towing vehicle 104 from disengaging from the parking gear when the power jack is in an extended position. In such an example, in response to receiving an instruction that the power jack is in an extended position, the controller private node 110 may instruct the transmission control unit to prevent the towing vehicle 104 form shifting from the parking gear and/or will provide a warning notification to the instrument cluster and/or to a smart device (such as a smartphone, tablet or the like). In some examples, the controller private node 110 and the trailer controller 106, after establishing a trusted relationship (e.g., an exchange of secret keys, etc.), use encryption (e.g., private key encryption, etc.) to wired and/or wireless communicate with each other such that a third party could not intercept unencrypted information being exchanged. For example, the controller private node 110 and the trailer controller 106 may encrypt information being shared over the wired connection to prevent a man-in-the-middle attack where a malicious actor inserts a dongle between the trailer-side connector and the towing vehicle-side connector.

The trailer controller 106 controls the other components of the electro-mechanical system 200 to control, for example, the motive capabilities of the trailer 102. The trailer controller 106 is configured to control the trailer 102 even when not communicatively coupled to the towing vehicle 104 (e.g., via the controller private node 110, etc.). For example, the trailer controller 106 may control the trailer 102 in an emergency state (e.g., a deliberate and controlled stop with audio and/or visual warnings, etc.) if the trailer controller 106 detects that the trailer 102 has mechanically disconnected from the towing vehicle 102 (sometimes referred to as "breakaway detection"). As another example, the trailer controller 106 may control the trailer 102 into a reduced operation state (e.g., relying on its own sensors to control the motive functions of the trailer 102 while providing a warning, etc.) if the trailer controller 106 detects that the trailer 102 has communicatively disconnected from the towing vehicle 102. To accomplish this, the trailer controller 106 receives status signals (e.g., vehicle speed, speed of each of the wheels, status of anti-lock brake system, status of stability control system, status of the collision detection/avoidance system, navigation data, positioning data, etc.) and/or control signals (e.g., braking control signals, acceleration control signal, lighting control signals, position of steering wheel, etc.) from the towing vehicle 104 (e.g., via the controller private node 110).

The trailer controller 106 may also provide control signals and status signals that are described below, as well as diagnostic and alert signals, to the towing vehicle 104. For example, the trailer controller 106 may provide the speed as measured by the wheel speed sensors of the trailer 102 and/or may provide the level of charge of the batteries 204, etc. That is, any information generated by the towing vehicle 104 may be communicated or otherwise made available to the trailer controller 106 and any information generated by the trailer controller 106 maybe communicated or otherwise made available to the towing vehicle 104 to enhance cooperation between the two vehicles 102 and 104.

In some examples, the trailer controller 106 includes an inertia sensor 214 (e.g., a gyroscope, a tilt sensor, an accelerometer, etc.) to measure whether the trailer is on an incline/decline and/or the grade of the incline/decline. The trailer controller 106 may use the measurements from the inertia sensor 214 when controlling the brakes 202 to compensate for when the trailer 102 is on an incline or a decline (e.g., an incline may require less braking force and a decline may require more braking force, etc.).

In some examples, the trailer controller 106 is communicatively coupled to one or more sensors that measure the relationship between the back of the towing vehicle 104 and the front of the trailer 102. The relationship may be the distance between the back of the towing vehicle 104 and the front of the trailer 102 at one or more points, and/or the relative angles between a plane defined by the back of the towing vehicle 104 and a plane defined by the front of the trailer 102. These sensors may be a physical sensor (e.g., a self-tensioning cable system that measure changes in length in a cable to keep the cable at the same tension, etc.) or an optical/sonic sensor (e.g., an infrared sensor, an ultrasonic sensor, a camera, etc.).

Ideally, during a normal driving experience, the speed of the trailer 102 and the speed of the towing vehicle 104 would be approximately equal. As such, the trailer controller 102 is configured to avoid excessive braking. However, in certain situations (e.g., the trailer 102 and the towing vehicle 104 are not on a flat surface, etc.), the speed of the trailer 102 and the towing vehicle 104 can vary. For example, a heavy trailer traveling on a decline may have tendency to increase its speed relative the towing vehicle 104. This is also an issue when the towing vehicle 104 begins braking, but before the trailer 102 can react (sometimes referred to as "surge braking"). In such situations, the momentum of the towing vehicle 104 reduces before the momentum of the trailer 102 changes, causing the trailer 102 to surge forward (e.g., causing a force from the trailer 106 towards the towing vehicle 104, etc.). The trailer controller 106 receives signals from the sensors described herein and controls the brakes 202 (and/or the wheel controllers 302 as described below) to maintain a general equilibrium between the trailer 102 and the towing vehicle 104, e.g., maintaining a predetermined pull force that is typically relatively low between the towing vehicle 104 and trailer 102, e.g., a pull force (i.e., the force of the towing vehicle 104 pulling the trailer 102 will be about 200 N, which can be in a range between 100-300 N). Alternatively or in addition, the trailer controller 106 receives signals from the sensors described herein and controls the brakes 202 (and/or the wheel controllers 302 as described below) to maintain a general equilibrium of speed between the trailer 102 and the towing vehicle 104, e.g., the speed of the trailer 102 and the towing vehicle 104 generally match (within about 1 mph therebetween). The trailer controller 106 may take into account the sampling rates of sensors, the reaction time of the brakes 202, and/or the reaction time of the wheel controllers 302 when determining how to control the trailer 102.

The force transducer 212 measures the force generated when the speed of the towing vehicle 104 (Vtowing) and the speed of the trailer 102 (Vtrailer) are not equal. That is, when (i) Vtowing=Vtrailer, the force transducer 212 measures substantially no force, (ii) Vtowing>Vtrailer, the force transducer 212 measures a forward force (i.e., relative to the normal travel direction), and (iii) Vtowing<Vtrailer, the force transducer 212 measures a backward force. The trailer controller 106 controls the brakes 202 such that the force transducer 214 measures substantially no force or a force within a threshold band around zero. When the force transducer 212 measures a forward force, the trailer controller 106 increases the braking force supplied by the brakes 202. When the force transducer 214 measures a backward force, the trailer controller 106 causes the brakes 202 to decrease the braking force. The force transducer output may be proportional to the braking effort of the towing vehicle 104, the grade of the road, and the mass of the trailer 102. In some examples, the trailer controller 106 intermittently or continuously calculates a coefficient to take into account these factors. The coefficient may be used to adjust the magnitude of the braking force used by the trailer controller 106 and/or to determine the maximum braking force that can be applied before the brakes lock. The trailer controller 106 may use the actual or estimated mass of the trailer 102. The braking force is proportional to the force measured by the force transducer 212.

For example, the trailer controller 106 may receive an inputted weight via (i) the private node controller 110 (e.g., input via the instrument panel/IVI 118) and/or (ii) a mobile device (e.g., as described below). In some examples, the trailer controller 106 estimates the mass (m) (as thus the weight) of the trailer 102 using the force (f) required to started pulling the trailer (e.g., as measured by the force transducer 214) while the trailer is on a flat surface (e.g., as measured by one or more inertia sensors 216A and 216B (collectively "inertia sensors 216") using a coefficient of static friction of tires ($\mu T$) (e.g., the trailer controller 106 may infer from weather data whether the road is wet or dry for purposes of selecting an applicable coefficient of static friction, etc.) and the gravitational force (g), where:

$$m = \frac{f}{\mu_T g} \qquad \text{(Equation 1)}$$

In some such examples, this calculation may be performed every time the trailer 102 is set in motion after a complete stop. 102. In some examples, the trailer controller 106 may measure the force of the trailer 102 and determine and acceleration from, for example, a speed sensor. In such examples, the trailer controller 106 may estimate the force and the acceleration. In some examples, the trailer controller 106 may maintain a running average of the estimated mass of the trailer The trailer controller 106 may perform an automatic gain detection and adjust the transfer function of the deceleration/push-pull force and the brake output. The trailer controller 106 may determine a transfer function based on braking intent and/or the braking signal sent to the trailer controller 106 by, for example, a brake controller of the towing vehicle 104 and/or retrieved from the communication bus of the towing vehicle 104. Braking intent is based on operating parameters or conditions associated with the trailer 102, towing vehicle 104, and/or the environment around the vehicles 102 and 104. For example, the operating conditions may include conditions of the towing vehicle brake system, towed/towing vehicle speed, the towing vehicle weight, the towed vehicle weight, the towed vehicle brake condition, road conditions (e.g., gravel, paved, weight, dry, etc.), weather conditions (e.g., precipitation, temperature, wind, etc.), or the like. The trailer controller 106 that may automatically (e.g., without user interaction) adjust the boost or gain settings of the transfer function to control the brakes 202. For example, a trailer controller 106 may determine a gain in a transfer function to utilize based on one or more of the operating parameters or conditions. The trailer controller 106 may also use historical operating parameters or conditions. Examples of a controller that performs an automatic gain detection and adjust the transfer function are described in U.S. Pat. No. 10,363,910, entitled "Automated Gain and Boost for a Brake Controller," which is herein incorporated by reference in its entirety. The operating parameters or conditions used by the trailer controller 106 maybe ones detected by the trailer controller 106 and/or ones that the towing vehicle 104 detects. In some example, the trailer controller 106 maintains or performs automatic gain control calculated for each wheel 210 and implement a gain control for each wheel 208 that may be different.

The trailer controller 106 may include range detection sensors that detect ranges and speeds of vehicles around the trailer 102. The example range detection sensors may include one or more cameras, ultra-sonic sensors, sonar, LiDAR, RADAR, an optical sensor, or infrared devices. These range detection sensors 104 can be arranged in and around trailer 102 in a suitable fashion. The trailer controller 106 may use the range detection sensors to, for example, supplement the collision avoidance system of the towing vehicle 104. In some examples, the trailer controller 106 provides intrusion detection signals (e.g., via a connection to the CAN bus of the towing vehicle 104, etc.) that report when a vehicle is detected in regions of interest (e.g., blind spots, tailgating spots, etc.) around the trailer 102. These intrusion detection signals may be configured to be interoperable with the collision avoidance system of the towing vehicle 104 such that the towing vehicle 104 uses the intrusion detection signals that originate from the trailer 102 as an extension of its own collision avoidance system. In a similar manner, the trailer controller 106 may be interoperable with the lane assist feature and/or the sway assist feature of the towing vehicle 104.

In some examples, the trailer 102 includes one or more cameras 218A-218D (collectively "cameras 218"). The trailer 102 includes a rearview camera 218A to capture visual data behind the trailer 102. In such examples, the trailer controller 106 may transmit the visual data to the towing vehicle 104 (e.g., via the connection with the private node 110) to be, for example, displayed to on an in-console display (e.g., of the infotainment system, etc.). In such a manner, the driver of the towing vehicle 104 may use the rearview camera 218A of the trailer 102 instead of its own rearview camera when backing up. The trailer 102 may include other cameras 218B-218D commutatively coupled to the trailer controller 106, that provide different views around the trailer 102 that may be communicated to the instrument panel/IVI 118. For example, the trailer 102 may include (a) an interior camera 218B to view an interior of the trailer 102, (b) side cameras 218C to view sides of the trailer for, for example, blind spot detection and/or sway detection, etc., and/or (c) an undercarriage camera 218D to view below the trailer, etc. In some such examples, the trailer controller 106 may stitch (e.g., using image stitching algorithms, etc.) together images or feeds from multiple cameras 218A-218D before delivering the images or feeds to the controller private node 110 for display on the instrument panel/IVI 118 or even to a mobile device.

The trailer controller 106 may implement sway control to assist in stabilizing the electronic trailer 102. For example, the trailer controller 106 may use measurements from the inertia sensor(s) 216A and 216B (e.g., an angle sensor and/or a lateral accelerometer, etc.) to determine lateral acceleration. In some examples, the trailer controller 106 detects roll or yaw in trailer 102 via angle sensor 216A and/or the range detection sensors. Depending on amplitude and frequency of sway, the trailer controller 106 applies brakes 110 to one or more of the wheels 210. The trailer controller 106 may also be coupled to a tilt angle sensor 216B that measures lateral tilt (e.g., one side of the trailer is higher than the other, etc.) that might be due to a flat tire, uneven terrain, etc. Any lateral tilt may be reported to the driver through the instrument panel/IVI 118.

The trailer controller 106 may control the lights 206 on trailer 102 (e.g., the left turn light, the right turn light, the tail light, stop lights, fog lights, reverse lights, hazard lights, etc.). The trailer controller 106 may control the lights 206 on the trailer 102 independently (e.g., by acting on signals received on the communication bus of the towing vehicle 104) and/or in coordination with the towing vehicle 104 (e.g., by acting on commands/instructions received from a lighting controller on the towing vehicle 104, etc.). Examples of controlling the lights 206 are described in U.S. patent application Ser. No. 15/707,385 entitled "Combination of Trailer Braking and Lighting Functions," which is herein incorporated by reference in its entirety. The trailer controller 106 may perform brake and light connectivity detection (e.g., detection connection when the lights are in the OFF state, etc.). Examples of light connectivity detection are described in U.S. patent application Ser. No. 17/376,595 entitled "Lighting State Detection for a Vehicle Trailer," which is herein incorporated by reference in its entirety.

The trailer controller 106 may detect and report the status of variety of accessories like coupler, jack, stabilizing jack, slideout room, water levels, weight and weight distribution, and/or grade, etc. In some examples, the trailer controller 106 generates diagnostic codes and/or other warning codes to be sent via the vehicle communication bus of the towing vehicle 104 and interpreted by the dashboard display and/or IVI 118 of the towing vehicle 104. For example, the trailer controller 106 may detect and report (a) diagnostic information, such as short-to-ground and/or short-to-battery the lights and/or brakes 202, connectivity of the brakes and lights, and/or a low voltage/SoC for the batteries 204, (b) readings from tire pressure monitoring system (TPMS) sensors in each wheel 208 of the trailer 106, (c) status of the coupler 108, (d) status of the trailer jacks, and/or (e) output of the backup assist camera of the trailer, etc. The diagnostic codes may be categorized and/or assigned a priority to facilitate the towing vehicle 104 displaying and/or reacting to the code. For example, if jack of the trailer 102 is down, the trailer controller 106 may generate a warning code that may be interpreted by the towing vehicle 104 to prevent from placing the towing vehicle 104 into drive. As another example, when the coupler 108 is not locked (e.g., the trailer 102 is electrically coupled but no mechanically coupled to the towing vehicle 104, etc.), the trailer controller 106 may provide a code that may be interpreted by the towing vehicle 104 to provide a warning not to drive the towing vehicle 100. In some examples, the trailer controller 102 may directly or indirectly communicate the codes to application operating on a mobile device (as described below). The trailer controller 106 may generate other example codes which may be used to inform the towing vehicle 104 whether the trailer 102 is level, whether the slideout room is out, and/or whether the tires of the wheels 208 are sufficiently inflated. In some examples, the trailer controller 106 may generate one or more diagnostic codes based on temperature sensors monitoring the temperature of the wheels 208 (e.g., to alert the driver when the wheels 208 are too hot, etc.).

In some examples, the trailer controller 106 issues instructions to the towing vehicle 104 to prevent the towing vehicle 104 from performing an action that would be detrimental to the trailer 102 based on the status of the trailer 102 as detected by the trailer controller 106. The trailer controller 106 may use a signal received from the towing vehicle to determine when to issue such instruction. For example, when (i) the power jack is extending, the slideout room is extended, and/or the power stairs are extended, and (ii) the trailer controller 106 detects that the ignition of the towing vehicle 104 has been switched to the "ON/RUN" position (e.g., receiving a message with the ignition position from the controller private node 110, inferring the ignition position based on information received from the towing vehicle 104, etc.), the trailer controller 106 may issue an instruction to prevent the towing vehicle from shifting out of the parking gear.

In some examples, the trailer controller 106 wirelessly connects (e.g., as described below) to a mobile device 220 to provide these codes to an application 222 operating on the mobile device. The application 222 interprets the codes and provides an interface to facilitate communicating, in an understandable way, the statuses being conveyed by the codes.

The trailer controller 106 may detect theft or other tampering with the electronic trailer 102 independent of the towing vehicle 104. For example, the trailer controller 106 may establish a secure relationship (e.g., via an exchange of cryptographic keys during an initial setup). In one example anti-theft detection mode, when the trailer controller 106 detects motion without being coupled to a recognized towing vehicle (e.g., though a security handshake with the controller private node 110, etc.), the trailer controller 106 determines that a theft may be occurring. Alternatively or additionally, in some examples, while in anti-theft detection mode, the trailer controller 106 determines that a theft may be occurring upon detection of any movement of the trailer, any movement of greater than a threshold distance (e.g., five feet, ten feet, etc.), and/or detection of a speed of the trailer 102 greater than a threshold speed (e.g., 2 miles an hour, etc.). In some examples, the trailer controller 106 may engage the brakes 202 unless the trailer controller 106 determines it is connected to a trusted controller private node 124 or an override signal is received from the application 222 operating on the mobile device 220, etc.

The trailer controller 106 may include one or more wireless networking devices (e.g., a Bluetooth® controller, Zigbee® controller, a Z-Wave® controller, a controller for wireless local area network based on IEEE 802.11 a/b/g/n/ac or others, cellular controller (e.g., e.g., Global System for Mobile Communications (GSM), Universal Mobile Telecommunications System (UMTS), Long Term Evolution (LTE), Code Division Multiple Access (CDMA), etc.), wide-area network controller (e.g., WiMAX (IEEE 802.16m), Wireless Gigabit (IEEE 802.11ad), etc.), etc.) to connect to mobile devices 220 (e.g., smartphones, smart watches, notebooks, tablets, laptops, etc.), non-mobile devices (e.g., charging stations, home networks, desktop computers, workstations, etc.), and/or remote devices (e.g., cloud-hosted servers, etc.) to report the status of the trailer 102 independent of the towing vehicle 104.

The trailer controller 106 includes a processor or controller and memory. The processor or controller may be any suitable processing device or set of processing devices such as, but not limited to: a microprocessor, a microcontroller-based platform, a suitable integrated circuit, one or more application-specific integrated circuits (ASICs), or one or more field programmable gate arrays (FPGAs). The memory may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, etc.), unalterable memory (e.g., EPROMs), read-only memory, and/or a high-capacity storage device (e.g., a hard drive, a solid state drive, etc.). In some examples, the memory includes multiple kinds of memory, particularly volatile memory and non-volatile memory. The memory is a computer readable medium on which one or more sets of instructions, such as the software and/or firmware for operating the methods of the present disclosure can be embedded. The instructions may embody one or more of the methods or logic as described herein. In a particular embodiment, the instructions may reside completely, or at least partially, within any one or more of the memory, the computer readable medium, and/or within the processor during execution of the instructions.

In the illustrated example, the trailer controller 106 is one hardware unit that directly controls the components of the trailer 102 as described above. In some examples, certain functionality of the trailer 102 may be directly controlled by electronic control units (ECUs) that are controlled by the trailer controller 106. In such an example, the trailer controller 106 is directly communicatively coupled to the sensors and is connected to the ECUs via an internal data bus (e.g., a CAN bus, a LIN bus, etc.). For example, the trailer 102 may include a camera ECU, a lighting ECU, a battery ECU, and a braking ECU. These ECUs include the hardware and firmware to control the corresponding systems. For example, a camera ECU may be directly coupled to the cameras 218 and includes a digital signal processing (DSP) controller that performs image preprocessing before communicating the images to the trailer controller 106. In some examples, the sensors 214 and 216 and/or the cameras 218 may be communicatively coupled to the trailer controller 106 via a unified data bus (e.g., a Peripheral Component Interconnect Express (PCIe) bus, Serial Peripheral Interface (SPI) bus, a Serial ATA (SATA) bus, a Fieldbus (such as a CAN bus, etc.), etc.).

Figure 3:
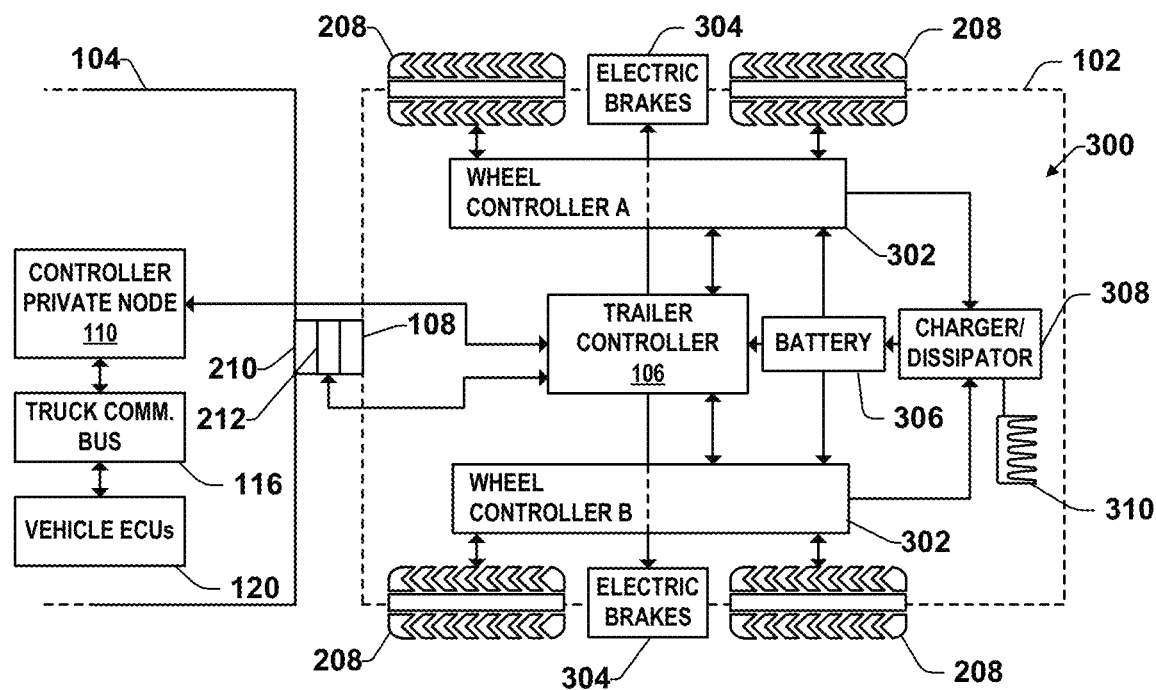
FIG. 3 is a block diagram of an electro-mechanical system of an electric trailer with the trailer controller of FIG. 1, in accordance with the teachings of this disclosure.

FIG. 3 illustrates an power and motive control system 300 that may be incorporated into the electro-mechanical system 200 of FIG. 2 for the trailer 102 that is an electric trailer connected to the towing vehicle 104. That is, for understandability, FIGS. 2 and 3 depict different portions of the electro-mechanical system 200. However, the electro-mechanical system 200 of FIG. 2 and the power and motive control system 300 of FIG. 3 may be two subsystems that exist in the same electro-mechanical system 200 as described herein for a trailer 102 that is an electric trailer. The power and motive control system 300 includes the trailer controller 106 to coordinate with and/or react to information received from the towing vehicle 104, sensors (e.g., force transducers, gyroscopes, accelerometers, angle sensors, wheel speed sensors, precipitation sensors, battery condition sensors, etc.) on the electric trailer 102 (e.g., as described above in connection with FIG. 2, etc.), and/or electronics that provide status indicators of parts of the electric trailer 102 (e.g., e.g., as described above in connection with FIG. 2, etc.). In the illustrated example, the electro-mechanical system 300 of the electric trailer 102 also includes wheel controllers 302, electric brakes 304, batteries 306, and a battery charger 308.

In the illustrated example, the wheel controllers 302 are each connected to two wheels 208. In examples in which the electric trailer 102 includes two wheels, the wheel controllers 302 may each be connected to a single wheel 208. The wheel controllers 302 includes an independent drive for each wheel 208 with components that receive power from the batteries 306 to drive the wheels 208 (e.g., electric motors, power conditioning circuitry, etc.). The electric motors may be brushless DC or PM motors with pulse width modulation (PWM) control for speed control. The wheel controllers 302 also include a wheel speed sensor for each wheel 308. Each of the wheel speed sensors may be a Hall Effect sensor embedded in the drive shaft of the corresponding wheel 208. In the illustrated example, the wheel controllers 302 are communicatively coupled to the trailer controller 106 to receive control signals to control the speed at which the wheels 208 are driven. For example, the wheel controllers 302 may be coupled to the trailer controller 106 via a serial bus, such as a Serial Peripheral Interface (SPI) bus or a Local Interconnect Network (LIN) bus. Alternatively, for example, the components of the electro-mechanical system 200 and/or the power and motive control system 300 may be connected together via a data bus, such as a CAN bus.

The brakes 304 are coupled to each of the wheels 208. The brakes 304 are communicatively coupled to the trailer controller 106 to be controlled by the trailer controller 106. The braking signals produced by the trailer controller 106 may comprise a pulse width modulation (PWM). Examples of techniques used by controllers to, at least in part, produce or rely on pulse width modulated braking signals are described in U.S. Pat. No. 6,068,352 entitled "Microprocessor-Based Control for Trailer Brakes," and U.S. Pat. No. 8,746,812 entitled "Brake Control Unit," which are both incorporated by reference herein their entirety.

The batteries 306 may be in a large array in the base frame of the trailer 102. The batteries 306 may, for example, provide 100 kilowatt-hours (kWh) of energy. The batteries 306 may have a battery monitor that (i) receives voltage signals from the batteries 306 and/or measurements from battery temperature sensors, etc., and (ii) provide diagnostic signals (e.g., state-of-charge (SoC), voltage level, temperature, etc.) to the trailer controller 106 and/or the battery charger 308. The battery charger 308 charges (e.g., via regenerative braking, via a charging station, etc.) batteries and/or dissipates excess energy (e.g., produced during emergency brake assist, etc.). In some examples, the battery charger 308 is connected to a heat sink 310 to facilitate dissipating excess energy.

The trailer controller 106 controls the other components of the power and motive control system 300 to control the motive capabilities of the electric trailer 102. The trailer controller 106 receives status signals (e.g., vehicle speed, speed of each of the wheels, status of anti-lock brake system, status of stability control system, status of the collision detection/avoidance system, navigation data, positioning data, etc.) and/or control signals (e.g., braking control signals, acceleration control signal, lighting control signals, position of steering wheel, etc.) from the towing vehicle 104 (e.g., via the controller private node 110). In some example, the trailer controller 106 may receive a signal indicative of driver intent (e.g., derived from probabilistic model that utilizes available cues to predict driver intent, etc.) from the towing vehicle 104. Alternatively or additionally, in some examples, the trailer controller 106 may derive driver intent from the control and status signals received form the towing vehicle 104. The trailer controller 106 may also provide control signals and status signals that are described below, as well as diagnostic and alert signals, to the towing vehicle 104. For example, the trailer controller 106 may provide the speed as measured by the wheel speed sensors of the electric trailer 102 and/or may provide the level of charge of the batteries 306, etc. That is, any information generated by the towing vehicle 104 may be communicated or otherwise made available to the trailer controller 106 and any information generated by the trailer controller 106 maybe communicated or otherwise made available to the towing vehicle 104 to enhance cooperation between the two vehicles 102 and 104.

The trailer controller 106 controls the wheel controllers 302 to drive the wheels 208. During normal operation, the trailer controller 106 tries to maintain a general equilibrium between the speed of the trailer 102 and the speed of the towing vehicle 104 whereby a predetermined pull force is maintained between the trailer 102 and the towing vehicle 104, e.g., maintaining a force between 100 N-300 N between the towing vehicle 104 and trailer 102. The trailer controller 106 is configured to drive the wheels 208 to maintain this equilibrium so to minimize the drag the trailer 102 is one the towing vehicle 104. That is, the trailer controller 106 is configured, as described herein, to avoid overdriving the trailer 102 (e.g., controlling the wheel controllers 302 to drive the wheels 208 too fast) and underdriving the trailer 102 (e.g., controlling the brakes 304 and/or the wheel controllers 302 to cause the trailer 102 to be too slow, etc.). The trailer controller 106 reacts dynamically to acceleration and braking events of the towing vehicle 104 to avoid being a drag and to void excessive braking. The trailer controller 106 receives speed measurements from the wheel speed sensors coupled to each of the wheels 208. The trailer controller 106 integrates control for all of the independent drives for the wheels 208. As described above, the force transducer 212 measures the force generated when the speed of the towing vehicle 104 (Vtowing) and the speed of the electric trailer 102 (Vtrailer) are not equal. That is, when (i)

Vtowing=Vtrailer, the force transducer 214 measures substantially no force, (ii) Vtowing>Vtrailer, the force transducer 212 measures a "forward force", and (iii) Vtowing<Vtrailer, the force transducer 212 measures a "backward force." Reference to forward force and backward force are related to the implementation of the force transducer 212, which are typically related to the normal travel direction of the towing vehicle 104. The trailer controller 106 controls the wheel controllers 302 to drive the wheels 208 such that the force transducer 214 measures substantially no force or a force within a threshold band between 100 N-300 N or more specifically around 200N (e.g., maintains an equilibrium of speed, etc.). When the force transducer 212 measures a forward force, the trailer controller 106 causes the wheel controllers 302 to increase the speed of the wheels 208. When the force transducer 212 measures a backward force, the trailer controller 106 causes the wheel controllers 302 and/or activate the electric brakes 304 to decrease the speed of the wheels 208. The force transducer output is proportional to the braking effort of the towing vehicle 104, the grade of the road, and the mass of the electric trailer 102. In some examples, the trailer controller 106 intermittently or continuously calculates a coefficient to take into account these factors. The trailer controller 106 may use the actual or estimated mass of the electric trailer 102. The trailer controller 106 uses a braking force to brake the trailer 102 and/or a driving force to drive the wheels 208 of the trailer 102 is proportional to the force measured by the force transducer 212. In some examples, trailer controller 106 implements a control system that outputs a target wheel speed as controls the motor drive (for an electric trailer) and/or braking force based on the force between the trailer 102 and the towing vehicle 104, the speed of the trailer 102 and/or the speed of the towing vehicle 104, acceleration of the trailer 102 and/or the acceleration of the towing vehicle 104, the state-of-charge of the battery, weight of the towing vehicle 102 and/or the trailer 102, weather conditions, signals used as indicia of driver intent, and/or other data signals received from the towing vehicle 104, etc. In some such examples, the control system is a feedback control system.

In some examples, the trailer controller 106 provides instructions to the wheel controllers 302 and the battery charger 308 to coordinate when the wheel controllers 302 are driving the wheels 208 and engaging in regenerative braking. In some such examples, the trailer controller 106 coordinates use of the electric brakes 304 and/or regenerative braking to regulate the speed of the electric trailer 102. In such a manner, the trailer controller 106 may employ regenerative braking to regulate the speed of the electric trailer 102 and charge the battery 306 even when there is no discrete braking event (e.g., a braking even initialed by an operator of the towing vehicle 104, etc.). In some examples, trailer controller 106 may track the state of the battery 306 (e.g., the SoC and/or the voltage level, etc.) and choose which method to regulate the speed of the electric trailer 102. In some examples, while the trailer controller 106 may use regenerative braking at other times, the trailer controller 106 uses regenerative braking when the SoC of the battery is below a threshold set to ensure that the batteries have enough charge to activate the brakes 304 in an emergency situation. For example, the threshold may be when the state of charge is at 50% or below. In some examples, the trailer controller 106 will use measurements from the inertia sensor 214 to determine the tilt of the trailer 102 to determine to use regenerative braking. For example, when the trailer 102 is tilted upward (e.g., the towing vehicle 104 and the trailer 102 are ascending a hill, etc.), the trailer controller 106 will not use regenerative braking. As another example, when the trailer 102 is tilted downward (e.g., the towing vehicle 104 and the trailer 102 are descending a hill, etc.), the trailer controller 106 may use regenerative braking as the first method of regulating the speed of the trailer 102.

Additionally, during emergency brake assist or other major braking events, the trailer controller 106 may employ both traditional braking via the brakes 304 and regenerative braking. Such events often generally use more energy than what could be useful in that moment. In some examples, the trailer controller 106 may direct the battery charger 308 to dissipate the excess energy generated during the event (e.g., via the heat sink 310 of the battery charger 308). The trailer controller 106 may have an anti-lock braking system that is independent of the towing vehicle 104 that uses the speeds of the wheels 208 of the electric trailer 102.

Figure 4A:
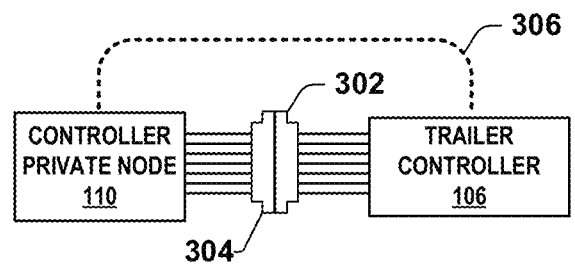
FIGS. 4A and 4B are block diagrams illustrating connections between the towing vehicle and the trailer, in accordance with the teachings of this disclosure.
Figure 4B:
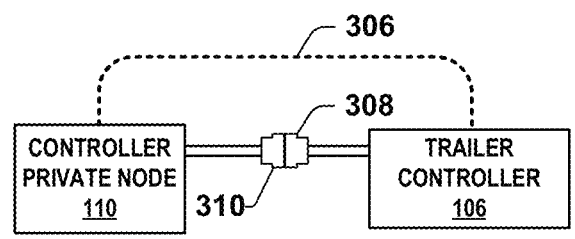

FIGS. 4A, and 4B are block diagrams illustrating connections between the towing vehicle 104 and the trailer 102, in accordance with the teachings of this disclosure. In the illustrated example of FIG. 4A, the trailer 102 (e.g., via the trailer controller 106) and the towing vehicle 104 (e.g., via the controller private node 110) are connected via a seven-wire connection system with a trailer-side connector 402 and a towing vehicle-side connector 404. The seven-wire system is generally an analog system that relies on an analog-type of communication (e.g., power lines carrying load current and/or pulse width modulated (PWM) signals, etc.). The seven-wire connection system uses seven wires to connect the electrically connect the trailer 102 to the towing vehicle 104. For example, the seven-wire connection system may include: (1) a ground wire that connects to electrical ground of the towing vehicle 104, (2) a trailer brake wire that communicates a braking signal, (3) a tail light wire that carries a signal to control the tail light of the lights 206 of the trailer 102, (4) a charging wire that carries voltage (e.g., 12 volts), (5) a right turn signal wire that carries a signal to control the right turn light of the lights 206 of the trailer 102, (6) a left turn signal wire that carries a signal to control the left turn light of the lights 206 of the trailer 102, and (7) a backup signal wire that carries a signal to control the backup of the lights 206 of the trailer 102. The trailer controller 106 acts as an intermediary of the signals received via the seven-wire connection system and treats the signals as evidence of driver intent. The trailer controller 106 may implement functions in response to receiving these signals. For example, the braking signal may be used as indicating the driver's intention to brake (e.g., timing and intensity of braking) while the trailer controller 106 controls the braking based on a transfer function that takes into account signals from the force transducer 212. While a seven-wire system is illustrated, an analog connection between the towing vehicle 104 and the trailer 102 may have more or fewer wires. Typically, the signals carried by the wires in the seven-wire system are generated with enough current to drive the system (e.g., light, brake, etc.) on the trailer associated with the signal. In some examples, because the trailer controller 106 controls the circuitry to drive the systems (e.g., the lights, the brakes, etc.), the controller private node 110 controls the signals that are communicated via the seven-wire connection system such that relatively low-current informational signals are communicated on the wires. This facilitates the seven-wire system of the illustrated example using a higher gauge wire providing space and weight savings associated with the connection compared to the traditional seven-wire system.

In the illustrated example of FIG. 4A, the trailer controller 106 and the controller private node 110 both include wireless communication controllers (as described above) to establish a wireless communication channel 406 between the trailer controller 106 and the controller private node 110. The trailer controller 106 uses the wireless communication channel 406 to communicate information to the controller private node 110 (as described above). For example, the trailer controller 106 may send diagnostic information to the controller private node 110 to be display on the instrument panel/IVI 118.

In the illustrated example of 4B, the trailer 102 (e.g., via the trailer controller 106) and the towing vehicle 104 (e.g., via the controller private node 110) are connected via a serial connection with a trailer-side connector 408 and a towing vehicle-side connector 410. The serial connection provides digital communication. In the illustrated example of FIG. 4B, the controller private node 110 collects the driver intent signals (e.g., via the CAN bus of the towing vehicle 102, etc.), converts them to digital values, and provides the intent signal via the serial connection. The trailer controller 106 uses the serial connection to communicate information to the controller private node 110 (as described above). For example, the trailer controller 106 may send diagnostic information to the controller private node 110 to be display on the instrument panel/IVI 118. In some examples, from time-to-time, the trailer controller 106 and the controller private node 110 exchange handshakes to facilitate the trailer controller 106 detecting when the serial connection has been disconnected. In the illustrated example of FIG. 4B, the trailer controller 106 and the controller private node 110 both include wireless communication controllers (as described above) to establish a wireless communication channel 406 between the trailer controller 106 and the controller private node 110. In some examples, the wireless communication channel 406 is used as a backup communication channel if the trailer controller 106 detects that the serial communication is disconnected. In some examples, the wireless communication channel 406 is a secondary communication channel where information that is time sensitive (e.g., emergency and/or warning messages, camera data, sway-control data, etc.) may be transmitted via the serial communication channel and information that is non-time sensitive (e.g., non-emergency diagnostic and sensor information, status information, etc.) is transmitted via the wireless communication channel 406.

Figure 5:
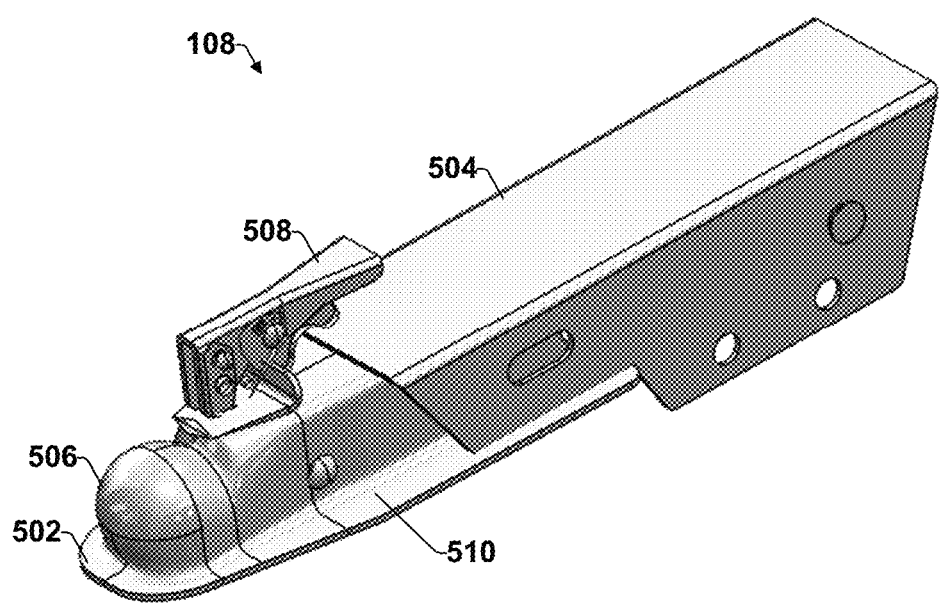
FIG. 5 illustrates a trailer coupler with a force transducer, in accordance with the teachings of this disclosure.

FIG. 5 illustrates an example of the trailer coupler 108 of FIGS. 1, 2, and 3. The coupler 108 includes a front piece 502 and a back piece 504. The front piece 502 includes a ball clamp 506 and a couple latch 508. The ball clamp 506 fits on a ball hitch of the towing vehicle 104 and the couple latch 508 operatively secures the ball clamp 506 onto the ball hitch to secure the trailer 102 to the towing vehicle 104. The back piece 504 is separate from the front piece and, in the illustrated example, slides on a ledge 510 of the front piece 502. A hydraulic master cylinder is mounted and secured within the back piece 504. One end of the hydraulic master cylinder (e.g. via a rod) is directly or indirectly connected to the front piece 502 such that the rod extends between the front piece 502 and a back piece 504 to distribute the weight between the two pieces 502 and 504 and allow for a more dynamic connection between the trailer 102 and the towing vehicle 104. When the towing vehicle 104 applies the brakes, the trailer 102 typically continues to move forward (sometimes referred to as "surging forward") as momentum pushes the trailer 102. This forces the front piece 502 to push into the back piece 504, and the rod pushes into the master cylinder.

Figure 6:
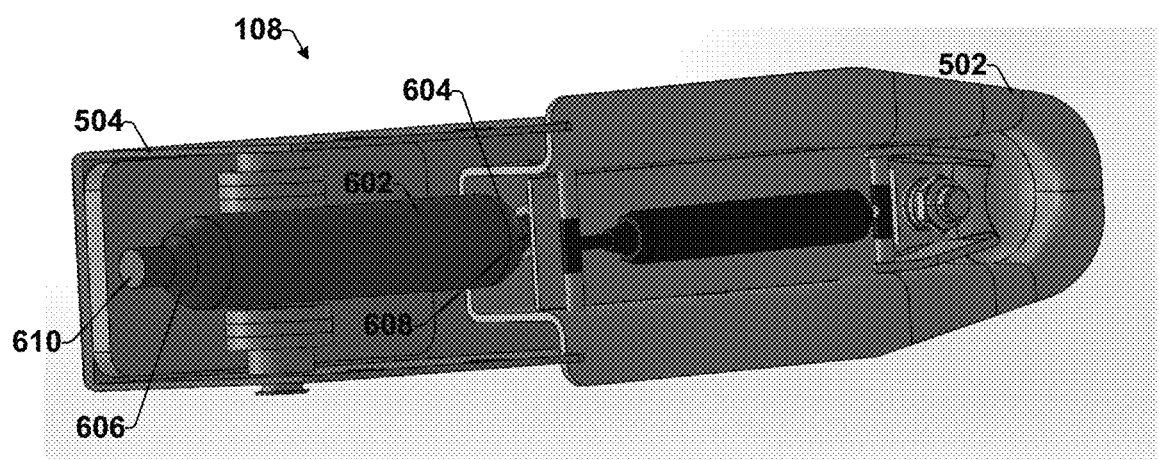
FIGS. 6 and 7 illustrate bottom view of an example of the trailer coupler of FIG. 5, in accordance with the teachings of this disclosure.

FIG. 6 illustrates a bottom view of an example coupler 108. The coupler 108 includes the front piece 502 and the back piece 504 as described above. The coupler 108 also includes a hydraulic master cylinder 602 with a proximal end 604 and a distal end 606. The proximal end 604 of the hydraulic master cylinder 602 includes a rod 608 that is coupled to the front end 502 such that the front end 502 sliding on the back end 504 causes the rod 608 to displace. As the front end 502 and the back end 504 compress relative each other (e.g., by a trailer 102 surging forward, etc.), the rod 608 pushes into the hydraulic master cylinder 602. Additionally, as the front end 502 and the back end 504 decompress relative each other (e.g., by the towing vehicle accelerating, etc.), the rod 608 pulls at least partially out of the hydraulic master cylinder 602. The distal end 606 includes a sensor 610 to measure hydraulic deflection caused by the movement of the rod 608 and/or the pressure differential caused by the movement of the rod 608 within the hydraulic master cylinder 602. The signal that measures the hydraulic deflection is sent to the trailer controller 106. In some examples, the coupler 108 may include an electronics assembly that performs preliminary processing of the signal (e.g., amplification, analog-to-digital conversion, filtering, etc.) and/or provides wired or wireless digital communication between the sensor 610 and the trailer controller 106.

Figure 7:
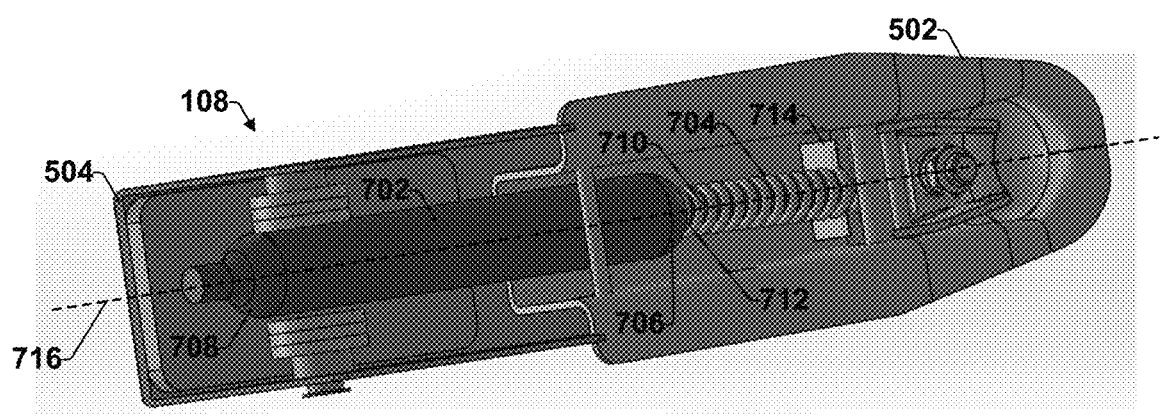

FIG. 7 illustrates a bottom view of an example coupler 108. The coupler 108 includes the front piece 502 and the back piece 504 as described above. The coupler 108 also includes a hydraulic master cylinder 702 and a spring 704. The hydraulic master cylinder 702 has a proximal end 706 and a distal end 708. The proximal end 704 of the hydraulic master cylinder 702 includes an elongated rod 710 that is coupled to the front end 502 such that the front end 502 sliding on the back end 504 causes the elongated rod 710 to displace. The spring 704 is coaxial with and wrapped around the elongated rod 710. As the front end 502 and the back end 504 compress relative each other (e.g., by a trailer 102 surging forward, etc.), the elongated rod 710 pushes into the hydraulic master cylinder 602 and the spring 704 compresses. Additionally, as the front end 502 and the back end 504 decompress relative each other (e.g., by the towing vehicle accelerating, etc.), the elongated rod 710 pulls at least partially out of the hydraulic master cylinder 602 and the spring 704 decompresses. The proximal end 708 includes a sensor 712 to measure spring displacement caused by the movement of the elongated rod 710. The signal that measures the spring displacement is sent to the trailer controller 106. In some examples, the front piece 502 may include an accelerometer 714 to measure the displacement of the front piece 502 along an axis 716 defined by the elongated rod 710. In some examples, the coupler 108 may include an electronics assembly that performs preliminary processing of the signal from the sensors 712 and/or the accelerometer 714 (e.g., amplification, analog-to-digital conversion, etc.) and/or provides wired or wireless digital communication between the sensors 712 and/or the accelerometer 714 and the trailer controller 106.

Figure 8:
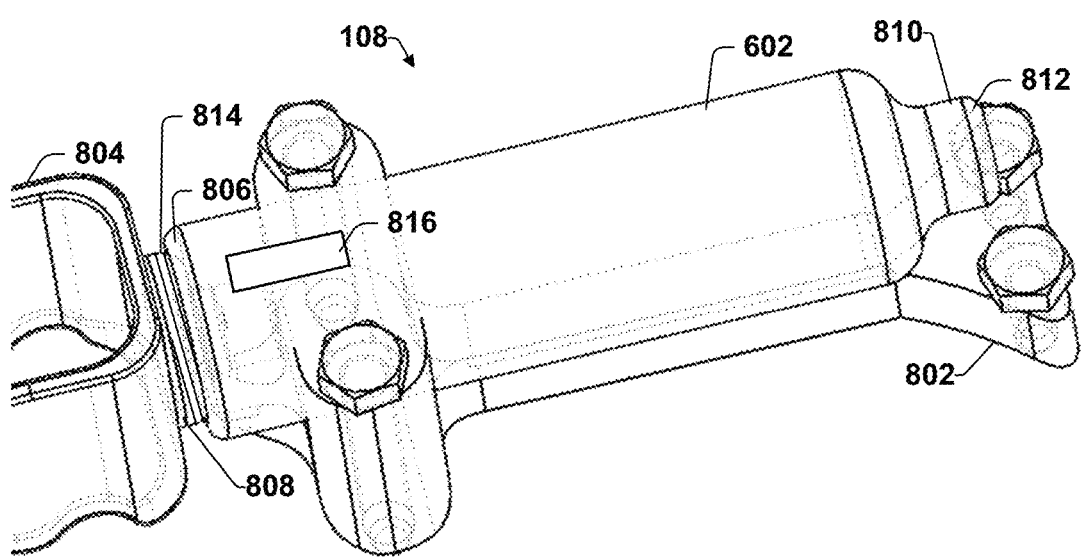
FIG. 8 illustrates an internal view of an example trailer coupler, in accordance with the teachings of this disclosure.

FIG. 8 illustrates an example coupler 108 configured for an off-road hitch (such as an articulating hitch, etc.). The example coupler 108 of FIG. 8 includes a frame 802, a connection piece 804, and a hydraulic master cylinder 602. The frame 802 attaches to the trailer 102 and the connection piece 804 connects to the corresponding connection piece of the hitch of the towing vehicle 104. The connection piece

804 may, for example, when connected to the corresponding connection piece of the hitch of the towing vehicle 104, provide multiple degrees of freedom of movement of the connection between the trailer 102 and the towing vehicle 104. A proximal end 806 of the hydraulic master cylinder 602 includes a rod 808 that is connected to the connection piece 804. In some examples, the rod 808 may be coaxial with a spring. The distal end 810 of the hydraulic master cylinder 602 may include a displacement sensor 812 to measure hydraulic deflection caused by the movement of the rod 808 and/or the pressure differential caused by the movement of the rod 808 within the hydraulic master cylinder 602. The proximal end 806 may include a spring sensor 814 to measure spring displacement caused by the movement of the rod 808 to the spring. In some examples, the proximal end 806 may include an accelerometer 816 and/or other sensors (such as force input, accelerometer, gyro and other speed inputs) to measure the relative displacement of the frame 802 and the hydraulic master cylinder 602. In some examples, the coupler 108 may include an electronics assembly that performs preliminary processing of the signal (e.g., amplification, analog-to-digital conversion, etc.) and/or provides wired or wireless digital communication between the sensors 812, 814, and 816 and the trailer controller 106.

Figure 9:
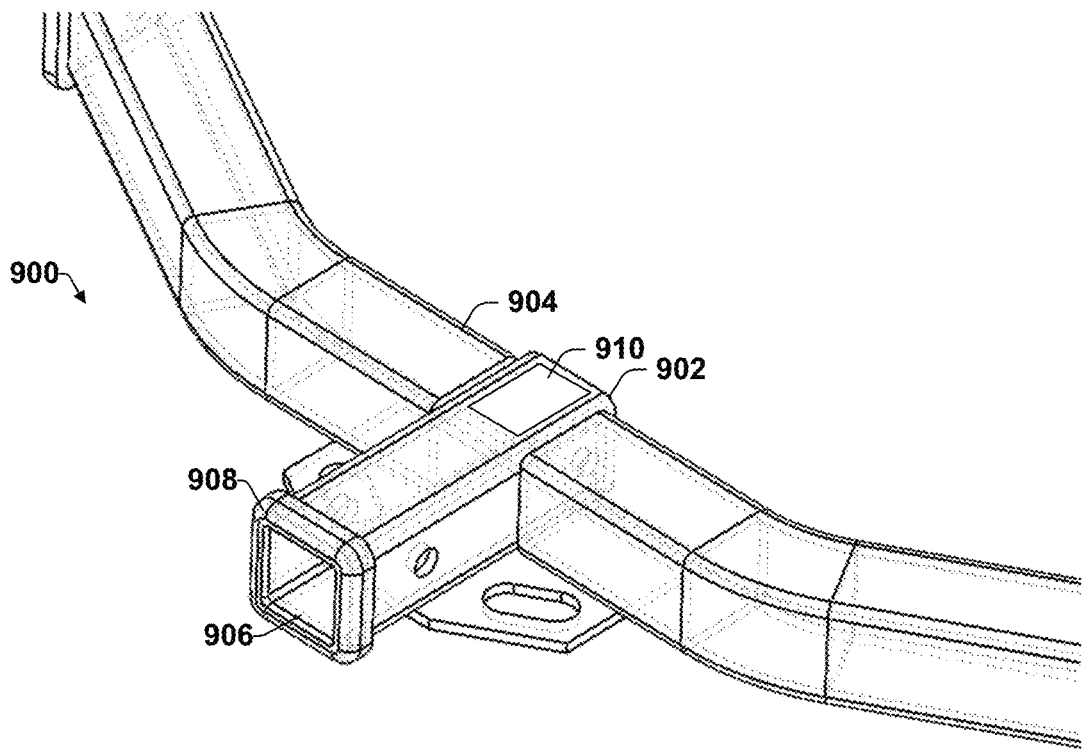
FIG. 9 illustrates a view of an example hitch mounting system, in accordance with the teachings of this disclosure.

FIG. 9 illustrates a hitch mounting frame 900 configured to be mounted to either (i) the towing vehicle 104 (and, e.g., receive a ball mount, etc.) or (ii) the trailer 102 (and, e.g., receive a modular couple or off-road hitch, etc.). For example, the hitch mounting frame 900 may be a receiver box 902 and a hitch frame 904 configured to be mounted the towing vehicle 104. In the illustrated example, the receiver box 902 includes an inner box 906 that is slidably coupled into an outer box 908. The inner box 906 and the outer box 908 are coupled by a hydraulic assembly 910 similar to those described above in connection with FIGS. 7 and 8. The hydraulic assembly 910 includes a hydraulic master cylinder in a space between a terminal end of the inner box 906 and a terminal end of the outer box 908. A rod of the hydraulic master cylinder connects to either the terminal end of the inner box 906 or the terminal end of the outer box 908. A sensor integrated into the hydraulic assembly 910 (e.g., as described above) measures hydraulic deflection caused by the movement of the rod and/or the pressure differential caused by the movement of the rod within the hydraulic master cylinder. The hydraulic assembly 910 also includes a wireless controller (e.g., a Bluetooth Controller®, etc.) wirelessly coupled to the trailer controller 106 to provide the measurements of the sensor to the trailer controller 106. In some examples, the hydraulic assembly 904 includes an accelerometer to measure the relative displacement of the inner box 906.

Figure 10:
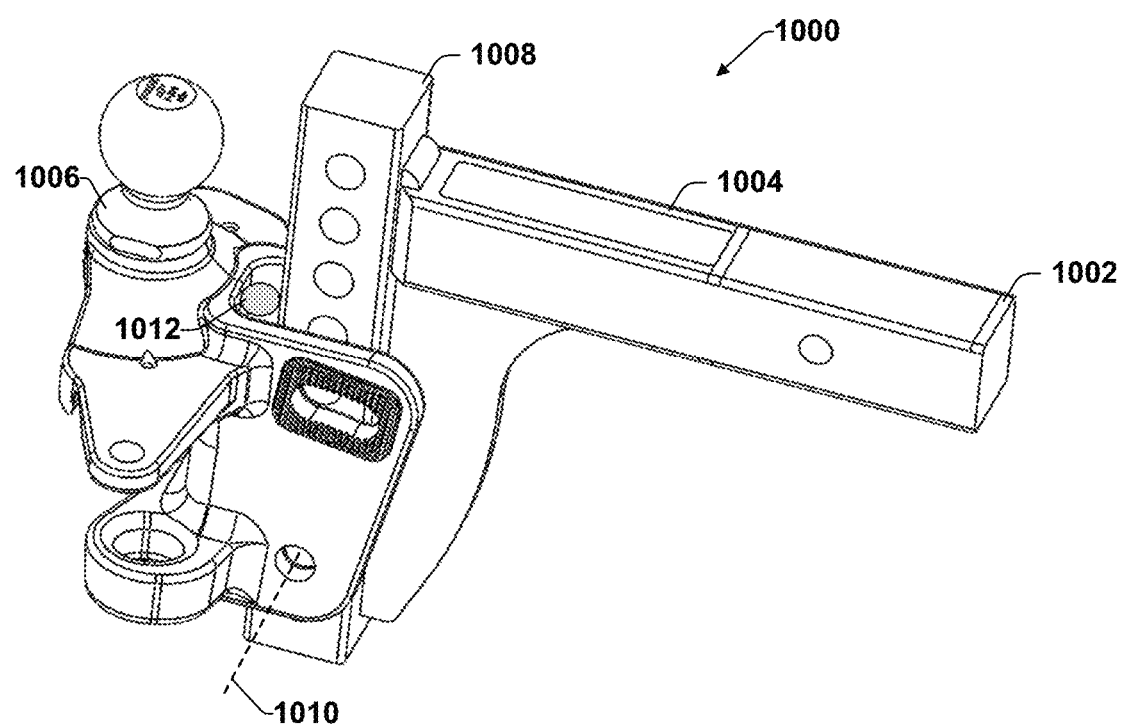
FIG. 10 illustrates a view of an example trailer coupler, in accordance with the teachings of this disclosure.

FIG. 10 illustrates an adjustable ball mount 1000. The adjustable ball mount 1000 may be, for example, a weight distributing hitch as described in U.S. Pat. No. 5,562,298, entitled "Weight Distributing Hitch Assembly," which is herein incorporated by reference in its entirety. The adjustable ball mount 1000 includes a hitch bar 1002 that may include a tubular mounting post 1004 for engagement in a receiver box of a hitch mount mounted to the towing vehicle 104. The adjustable ball mount 1000 also includes ball mount head 1006 that is at least partially rotationally secured to a mounting rack 1008 of the hitch bar 1002 by means of two cooperating fasteners. That is, the ball mount head 1006 can pivot with a limited degree of rotational freedom about an axis 1010 defined by one of the cooperating fasteners. The adjustable ball mount 1000 includes a sensor assembly 1012. In some examples, the sensor assembly includes receiver box 902 a spring and a spring displacement sensor attached between the ball mount head 1006 and the mounting rack 1008. In some examples, the sensor assembly 1012 includes a sensor (e.g., a capacitive sensors, an inductive sensor, a piezoresistive sensor, a magnetoresistive sensor, a hall effect, sensor, etc.) mounted on the mounting rack 1008 to measure a change in a characteristic (such as capacitance, inductance, etc.) as the ball mount head 1006 moves in relation to the mounting rack 1008 as the force between the trailer 102 and the towing vehicle 104 change. The sensor assembly 1012 includes and/or is communicatively coupled to a wireless controller (e.g., a Bluetooth Controller®, etc.) wirelessly coupled to the trailer controller 106 to provide the measurements of the sensor to the trailer controller 106.

The assemblies described in FIGS. 6, 7, and 8 are not mutually exclusive with the assemblies described in FIGS. 9 and 10. For example, a trailer 102 may include the coupler 108 of FIG. 6 and the towing vehicle 104 may include the hitch mounting frame 900 and/or the adjustable ball mount 1000. In such examples, the trailer controller 106 may receive measurements from multiple sensors (e.g., multiple force transducers, etc.) and may process those sensors (e.g., a running averages, etc.) to determine the force between the trailer 102 and the towing vehicle 104. Additionally, in some examples, the hydraulic master cylinder described in FIGS. 6, 7, 8 and 9 may alternatively be a spring where the sensor measures a change in characteristic of the spring.

In some examples, the trailer controller 106 has an autonomous mode that autonomously (e.g., with no intermediary instructions from a user, etc.) or semi-autonomously (e.g., with some intermediary instructions from a user, etc.) moves the trailer 102 while not being hitched to the towing vehicle 104. The trailer controller 106 may limit the autonomous mode to when the trailer controller 106 detects that the trailer 102 is not hitched to the towing vehicle 104. The trailer controller 102, in autonomous mode, uses the range detection sensors, sensors 214 and 216 and/or the cameras 218 to control the motive functions of the trailer 102 to (i) align the trailer 102 into a hitching position behind a towing vehicle 104 (e.g., a towing vehicle 104 with which it has an established relationship) and/or (ii) move the trailer 102 into a designated parking spot. In some examples, the towing vehicle 104 may cooperate with the trailer 102 to provide the pose (e.g., the coordinates and orientation) of the hitch. In some examples, when the towing vehicle 104 has an autonomous mode, the trailer 102 and the towing vehicle 104 may cooperate to autonomously hitch the trailer 102 to the towing vehicle 104. In such embodiments, a jack may be attached to the trailer 102 and may be used as a mechanism to drive the trailer 102 in the autonomous mode. In these embodiments, the user may push the jack to control the direction of travel and/or speed of travel of the trailer 102.

Although the embodiments of this disclosure have been illustrated in the accompanying drawings and described in the foregoing detailed description, it is to be understood that the present disclosure is not to be limited to just the described embodiments, but that the embodiments described herein are capable of numerous rearrangements, modifications and substitutions without departing from the scope of the claims hereafter. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define an introducing device and/or introducing system. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. The claims as follows are intended to include all modifications and alterations insofar as they come within the scope of the claims or the equivalent thereof.

The invention claimed is:

1. A trailer controller assembly, the trailer controller assembly comprising:
    a force transducer configured to measure a force between a trailer and a towing vehicle connected to the trailer indicative of a difference in speeds between the trailer and the towing vehicle;
    a controller communicatively coupled to the force transducer, the controller comprising a brake controller configured to control brakes of the trailer based on an input signal from the force sensor; and
    a coupler, the coupler including a front piece, a back piece, and a hydraulic cylinder coupled to the front piece and the back piece, wherein the front piece and the back piece are slidably coupled, and wherein the force transducer measures a quality of the hydraulic cylinder as the front piece and the back piece move relative to each other.

2. The trailer controller assembly of claim 1, wherein the front piece includes a sensor to measure displacement of the front piece as the front piece and the back piece move relative to each other.

3. The trailer controller assembly of claim 1, a spring coupled to the front piece and the back piece, wherein the force transducer measures a quality of the spring as the front piece and the back piece move relative to each other.

4. The trailer controller assembly of claim 1, wherein the force transducer is coupled to a hitch mounting frame of a towing vehicle, and wherein the force transducer is coupled to a wireless device to wirelessly couple the force transducer to the controller.

5. The trailer controller assembly of claim 1, wherein the brake controller is configured to control the brakes of the trailer to maintain a predetermined force between the trailer and the towing vehicle based on the input signal from the force sensor.

6. The trailer controller assembly of claim 5, wherein the brake controller is configured to estimate a current weight of the trailer based on the signal from the force transducer and a speed of the trailer measured by one or more speed sensors on the trailer.

7. The trailer controller assembly of claim 1, wherein the controller comprising an electric controller configured to communicatively couple to electric motor controllers of the trailer that drive electric motors to provide motive force to the trailer independent of the towing vehicle, the electric controller to control a driving speed at which the electric motor controllers drive the electric motors.

8. The trailer controller assembly of claim 7, wherein the electric controller is configured to independently control the driving speed of each of the electric motors to control a speed of each of the wheels independently.

9. The trailer controller assembly of claim 7, wherein the trailer controller is configured to maintain a predetermine force between the trailer and the towing vehicle based on the input signal from the force sensor by (i) controlling the brakes of the trailer, (ii) controlling the driving speeds of the electric motors of the trailer, and (iii) engaging a regenerative braking system of the trailer.

10. The trailer controller assembly of claim 1, wherein the controller is communicatively coupled to a towing vehicle and receives braking information from the towing vehicle.

11. The trailer controller assembly of claim 1, wherein the controller is communicatively coupled to a towing vehicle via a wired connection, and wherein the braking information is received from a data bus over the wired connection and does not have full current sufficient to control the brakes of the trailer.

12. The trailer controller assembly of claim 11, wherein the controller is configured to establish an encrypted connection with a private node of the towing vehicle.

13. The trailer controller assembly of claim 1, wherein the controller is communicatively coupled to a towing vehicle via a wireless connection, and wherein the braking information is received over the wireless connection.

14. The trailer controller assembly of claim 1, where in the wherein the controller is communicatively coupled to a towing vehicle via (i) a first communication controller that establishes a wired connection, (ii) a second communication controller that establishes a first wireless connection, and (iii) a third communication controller that establishes a second wireless connection.

15. The trailer controller of claim 14, wherein signals that originate from the towing vehicle are communicated via the first communication controller and signals that originate from the controller are communicated via one of the first or second communication controllers.

16. The trailer controller of claim 1, further comprising a battery controller configured to monitor a status of a battery of the trailer and implement regenerative braking when instructed by the controller, wherein the controller controls the speed of the trailer using regenerative braking when a state-of-charge of the battery is below a threshold value.

17. A trailer controller assembly to control motive functions of an electric trailer, the trailer controller assembly comprising:
    a coupler, the coupler including a front piece, a back piece, and a hydraulic cylinder coupled to the front piece and the back piece, wherein the front piece and the back piece are slidably coupled;
    a force transducer mounted to the coupler and configured to measure a force between a towing vehicle and the trailer connected to the towing vehicle indicative of a difference in speeds between the trailer and the towing vehicle, the force transducer measuring a quality of the hydraulic cylinder as the front piece and the back piece move relative to each other; and
    a controller communicatively coupled to the force transducer, the controller comprising:
        a communication controller configured to communicatively couple to the towing vehicle to receive braking information of the towing vehicle over a data bus;
        an electric controller configured to communicatively couple to electric motor controllers of the trailer that drive electric motors to provide motive force to the trailer independent of the towing vehicle, the electric controller to control a driving speed at which the electric motor controllers drive the electric motors; and a brake controller configured to control brakes of the trailer based on an input signal from the force sensor to maintain a predetermined force between the trailer and the towing vehicle.

18. The trailer controller assembly of claim 17, wherein the force transducer is a first force transducer, and wherein the trailer controller assembly comprises a second force transducer positioned on a hitch assembly of the towing vehicle and wirelessly communicatively coupled to the controller to provide a redundant measurement of the force between the trailer and the towing vehicle.

19. The trailer controller of claim 17, wherein the controller is configured to establish an encrypted connection with the towing vehicle, and wherein the braking information received from the towing vehicle does not have sufficient current to control the brakes of the trailer.

20. A trailer controller assembly, the trailer controller assembly comprising:

a force transducer configured to measure a force between a trailer and a towing vehicle connected to the trailer indicative of a difference in speeds between the trailer and the towing vehicle;

a controller communicatively coupled to the force transducer, the controller comprising a brake controller configured to control brakes of the trailer based on an input signal from the force sensor;

wherein the brake controller is configured to:
  estimate a current weight of the trailer based on the signal from the force transducer and a speed of the trailer measured by one or more speed sensors on the trailer, and
  control the brakes of the trailer to maintain a predetermined force between the trailer and the towing vehicle based on the input signal from the force sensor and the current weight.

* * * * *